US010093199B2

(12) United States Patent
Yamamoto et al.

(10) Patent No.: US 10,093,199 B2
(45) Date of Patent: Oct. 9, 2018

(54) VEHICLE AND CONTROL METHOD FOR VEHICLE

(71) Applicant: Toyota Jidosha Kabushiki Kaisha, Toyota-shi, Aichi-ken (JP)

(72) Inventors: Toshihiro Yamamoto, Toyohashi (JP); Kenji Yamada, Komaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/495,171

(22) Filed: Apr. 24, 2017

(65) Prior Publication Data

US 2017/0313206 A1    Nov. 2, 2017

(30) Foreign Application Priority Data

Apr. 28, 2016   (JP) ................. 2016-091159

(51) Int. Cl.
*B60L 15/00*   (2006.01)
*B60L 11/18*   (2006.01)
*B60L 15/08*   (2006.01)
*H02P 27/08*   (2006.01)

(52) U.S. Cl.
CPC ......... *B60L 15/007* (2013.01); *B60L 11/1803* (2013.01); *B60L 11/1861* (2013.01); *B60L 11/1879* (2013.01); *B60L 15/08* (2013.01); *H02P 27/08* (2013.01); *B60L 2210/42* (2013.01); *B60L 2220/14* (2013.01)

(58) Field of Classification Search
CPC .. B60L 11/1803; B60L 15/08; B60L 2210/42; B60L 2220/14; H02P 27/08
See application file for complete search history.

(56) References Cited

U.S. PATENT DOCUMENTS

| 2009/0108794 | A1* | 4/2009 | Ochiai .............. H02M 7/53875 318/760 |
| 2009/0115362 | A1* | 5/2009 | Saha ...................... B60K 6/26 318/400.09 |
| 2009/0237022 | A1* | 9/2009 | Yamamoto ............ B60L 15/025 318/400.26 |
| 2010/0052583 | A1  | 3/2010 | Takamatsu et al. |
| 2012/0173066 | A1* | 7/2012 | Yamada .............. B60L 11/1803 701/22 |
| 2013/0200830 | A1  | 8/2013 | Suzuki et al. |
| 2014/0001990 | A1* | 1/2014 | Takamatsu .............. H02P 27/08 318/400.22 |

(Continued)

FOREIGN PATENT DOCUMENTS

| JP | H0614557 A | 1/1994 |
| JP | 2008-072802 A | 3/2008 |

(Continued)

*Primary Examiner* — Muhammad S Islam
(74) *Attorney, Agent, or Firm* — Dinsmore & Shohl LLP

(57) ABSTRACT

When an absolute value of a rotation speed change rate of a motor is equal to or less than a threshold and an absolute value of a torque command change rate of the motor is equal to or less than a threshold, a switching angle is changed by cyclically changing a pulse type or the number of pulses as change in a pulse pattern. With this, respective order components of harmonics are dispersed, whereby it is possible to reduce the degree of prominence of a specific order component in harmonics relative to other order components.

10 Claims, 7 Drawing Sheets

(56) References Cited

U.S. PATENT DOCUMENTS

2014/0225536 A1* 8/2014 Yamada .................. B60L 15/02
318/51

FOREIGN PATENT DOCUMENTS

| JP | 2010-057243 A | 3/2010 |
|----|---------------|--------|
| JP | 2013162660 A  | 8/2013 |
| JP | 2016-005370 A | 1/2016 |

* cited by examiner

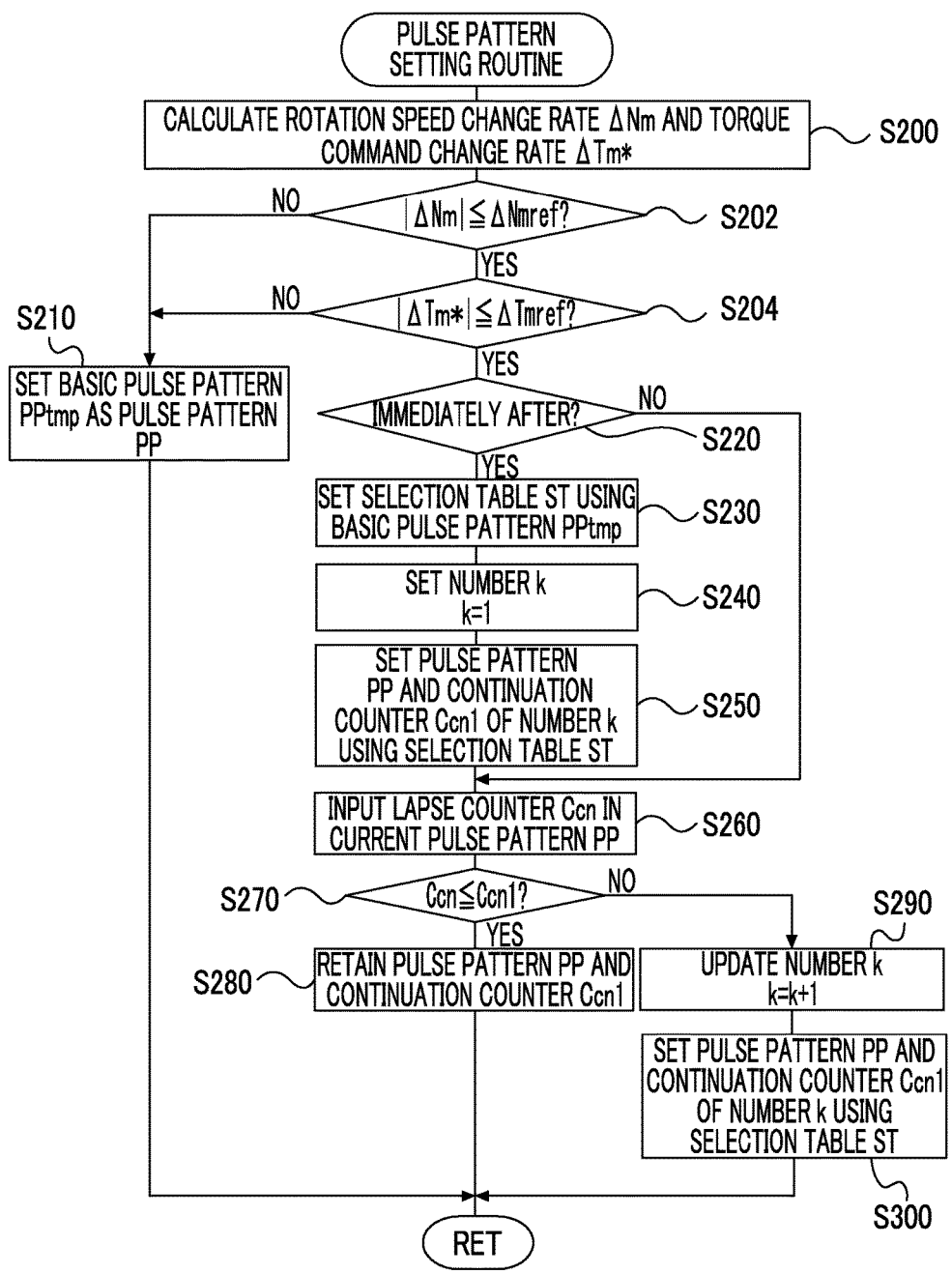

FIG. 5A

BASIC PULSE PATTERN PPtmp: WHEN PATTERN A

| NUMBER k | PULSE PATTERN PP | CONTINUATION COUNTER Ccn1 |
|---|---|---|
| 1 | PATTERN A | 60 |
| 2 | PATTERN B | 5 |
| 3 | PATTERN A | 6 |
| 4 | PATTERN B | 45 |
| 5 | PATTERN A | 23 |
| . | . | . |
| . | . | . |
| . | . | . |

FIG. 5B

BASIC PULSE PATTERN PPtmp: WHEN PATTERN C

| NUMBER k | PULSE PATTERN PP | CONTINUATION COUNTER Ccn1 |
|---|---|---|
| 1 | PATTERN A | 60 |
| 2 | PATTERN D | 5 |
| 3 | PATTERN C | 15 |
| 4 | PATTERN A | 30 |
| 5 | PATTERN C | 5 |
| . | . | . |
| . | . | . |
| . | . | . |

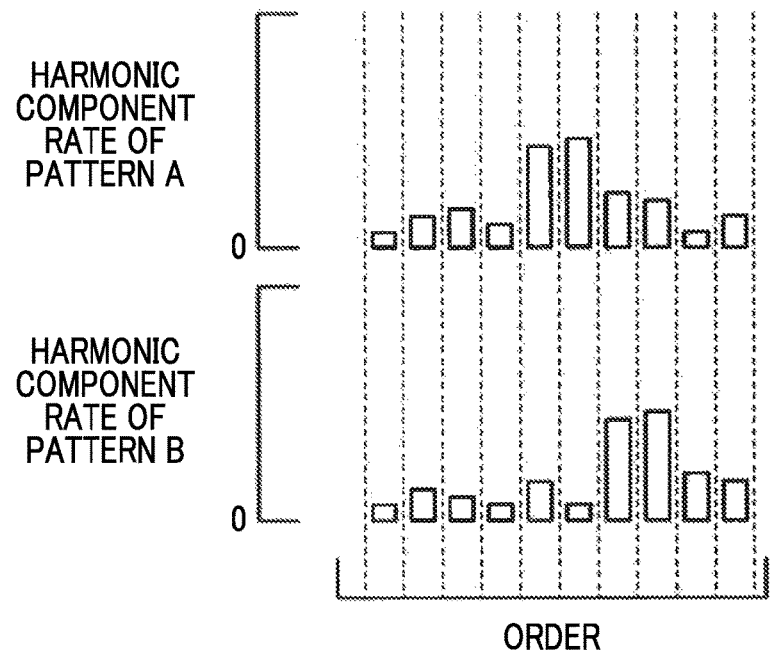

VEHICLE AND CONTROL METHOD FOR VEHICLE

CROSS-REFERENCE TO RELATED APPLICATIONS

This application claims priority to Japanese Patent Application No. 2016-091159 filed on Apr. 28, 2016 which is incorporated herein by reference in its entirety including the specification, drawings and abstract.

BACKGROUND

1. Technical Field

The present disclosure relates to a vehicle, and in particular, to a vehicle including a motor, an inverter, and a battery, and a control method for a vehicle.

2. Description of Related Art

Hitherto, as this kind of vehicle, a vehicle which includes an electric motor and an electric power conversion device having an inverter circuit configured to drive the electric motor through switching of a plurality of switching elements, and generates a pulse signal of a plurality of switching elements based on the number of pulses at one electric cycle of the electric motor and a modulation factor and a voltage phase of a voltage based on a torque command of the electric motor to perform switching of a plurality of switching elements has been suggested (for example, see Japanese Patent Application Publication No. 2013-162660 (JP 2013-162660 A)). In this vehicle, the pulse signal is generated such that electric power loss of the electric power conversion device and the electric motor becomes minimum based on the number of pulses, the modulation factor, and the voltage phase, thereby achieving reduction in loss of an entire drive system having the electric power conversion device and the electric motor.

SUMMARY

In the above-described vehicle, when a target operation point of the electric motor is substantially constant, a switching angle in the pulse signal, that is, an angle for switching a phase voltage (on/off of a switching element of a corresponding phase among a plurality of switching elements of the inverter circuit) of the electric motor becomes substantially constant. For this reason, a specific order component in harmonics may be comparatively increased, and electromagnetic noise may be comparatively increased.

A vehicle of the disclosure suppresses an increase in electromagnetic noise.

An example aspect of the present disclosure discloses a vehicle. The vehicle includes a motor for traveling, an inverter configured to drive the motor through switching of a plurality of switching elements, a battery configured to exchange electric power with the motor through the inverter and an electronic control unit configured to generate a PWM signal of the plurality of switching elements based on a switching angle and a switching pattern at the switching angle, the switching angle being an angle based on a modulation factor of a voltage based on a torque command of the motor, a voltage phase of the voltage based on a torque command of the motor and a number of pulses at a predetermined cycle of an electric angle of the motor, perform switching of the plurality of switching elements based on the PWM signal, and cyclically change the switching angle when both of a rotation speed change rate and a torque command change rate are within a predetermined range including zero, the rotation speed change rate being an amount of change in a rotation speed of the motor per unit time, the torque command change rate being an amount of change in the torque command per unit time. An example aspect of the present disclosure discloses a control method for a vehicle. The vehicle includes a motor for traveling, an inverter configured to drive the motor through switching of a plurality of switching elements, a battery configured to exchange electric power with the motor through the inverter, and an electronic control unit. The control method includes generating a PWM signal of the plurality of switching elements based on a switching angle and a switching pattern at the switching angle by the electronic control unit, the switching angle being an angle based on a modulation factor of a voltage based on a torque command of the motor, a voltage phase of the voltage based on a torque command of the motor and a number of pulses at a predetermined cycle of an electric angle of the motor, performing switching of the plurality of switching elements based on the PWM signal by the electronic control unit, and cyclically changing the switching angle when both of a rotation speed change rate and a torque command change rate are within a predetermined range including zero by the electronic control unit, the rotation speed change rate being an amount of change in a rotation speed of the motor per unit time, the torque command change rate being an amount of change in the torque command per unit time.

In the vehicle of the disclosure, the PWM signal of a plurality of switching elements is generated based on the switching angle, based on the modulation factor and the voltage phase of the voltage based on the torque command of the motor and the number of pulses at the predetermined cycle of the electric angle of the motor, and the switching pattern at the switching angle to perform switching of a plurality of switching elements. Then, when both of the rotation speed change rate as the amount of change in the rotation speed of the motor per unit time and the torque command change rate as the amount of change in the torque command per unit time are within the predetermined range including 0, the switching angle is cyclically changed. With this, respective order components of harmonics are dispersed, whereby it is possible to reduce to the degree of prominence of a specific order component in harmonics relative to other order components. As a result, it is possible to suppress an increase in electromagnetic noise. Here, the term "switching angle" means an angle for switching a phase voltage (on/off of a switching element of a corresponding phase among a plurality of switching elements) of each phase of the motor. The term "switching pattern" means a combination of on/off of a plurality of switching elements.

In the vehicle of the disclosure, the electronic control unit may be configured to change the switching angle by cyclically changing the number of pulses when both of the rotation speed change rate and the torque command change rate are within the predetermined range. With this, the switching angle is changed by changing the number of pulses, whereby it is possible to disperse respective order components of harmonics.

In the vehicle of the disclosure, the electronic control unit may be configured to generate the PWM signal based on the modulation factor, the voltage phase, the number of pulses, and a selected type selected from a plurality of pulse types including a pulse type that generates the PWM signal to reduce iron loss of the motor and a pulse type that generates the PWM signal to reduce harmonics, and the electronic control unit is configured to change the switching angle by cyclically changing at least one of the number of pulses or the selected type when both of the rotation speed change rate and the torque command change rate are within the predetermined range. With this, the switching angle is changed by changing the number of pulses or the selected type, whereby it is possible to disperse respective order components in harmonics. Then, if both of the number of pulses and the selected type are changed, it is possible to further disperse respective order components in harmonics.

In the vehicle of the disclosure, the electronic control unit may be configured to cyclically change the switching angle such that an order corresponding to a component having the highest harmonic component rate in harmonics before the switching angle is changed differs from an order corresponding to a component having the highest harmonic component rate in harmonics after the switching angle is changed. The electronic control unit may be configured to control the plurality of switching elements in a first switching pattern and a second switching pattern by cyclically changing the switching angle, and an order of the harmonics most frequently appearing in the first switching pattern may be different from an order of the harmonics most frequently appearing in the second switching pattern. With this, it is possible to more effectively disperse respective order components in harmonics.

In the vehicle of the disclosure, the electronic control unit may be configured to change the cycle for changing the switching angle. With this, it is possible to further disperse respective order components in harmonics.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing an example of a pulse pattern setting routine;

FIGS. 5A and 5B are explanatory views showing an example of a plurality of tables;

FIG. 6 is an explanatory view showing an example of the relationship between a pulse pattern and a harmonic component rate of each order in harmonics;

FIG. 7 is an explanatory view showing an example of a state of change in a PWM signal of a U-phase when a pulse type is changed as change in a pulse pattern without changing the number of pulses.

DETAILED DESCRIPTION OF EMBODIMENTS

Next, a mode for carrying out the disclosure will be described in connection with an example.

Figure 1:
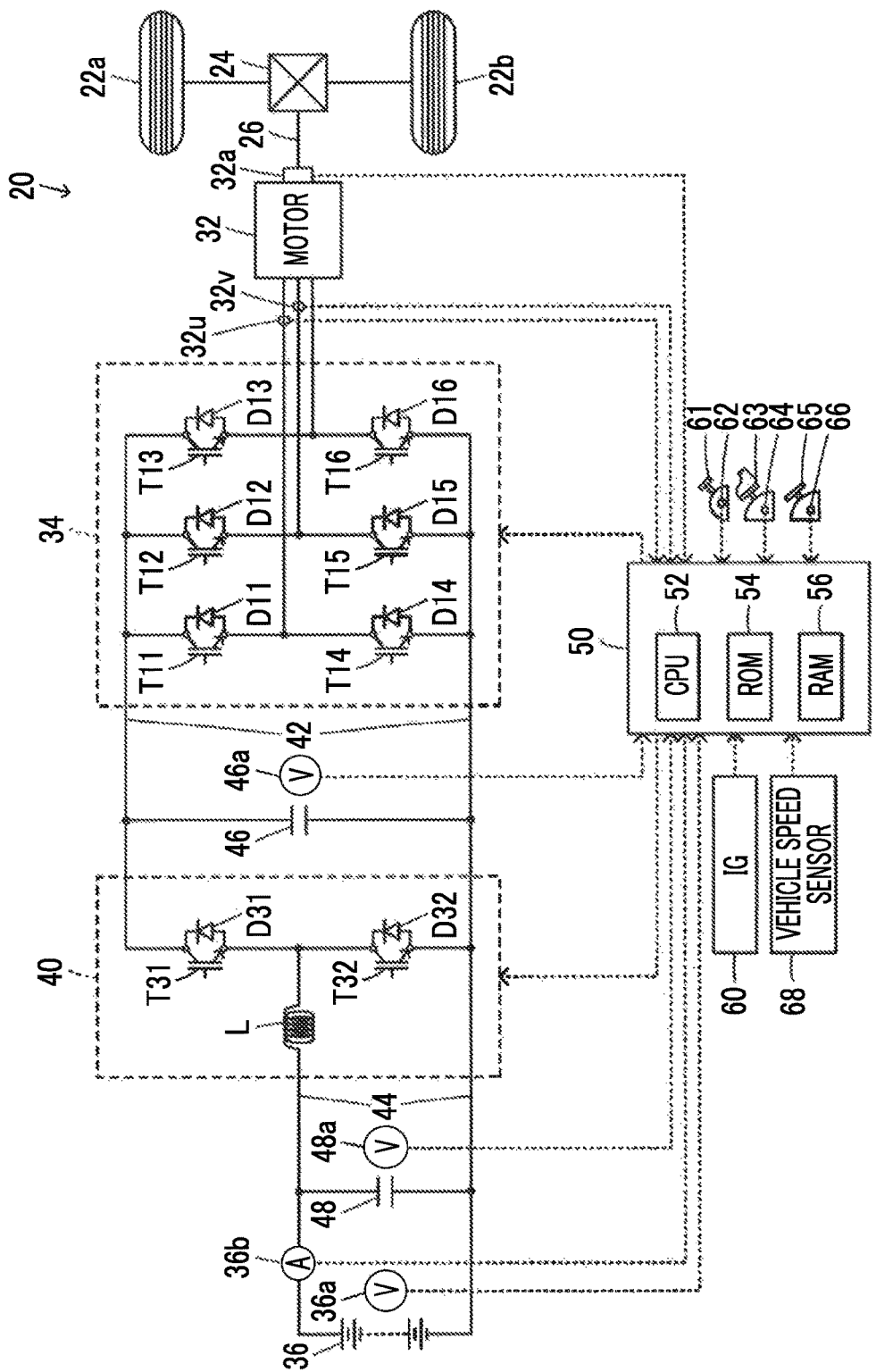
FIG. 1 is a configuration diagram showing the outline of the configuration of an electric vehicle as an example of the disclosure.

FIG. 1 is a configuration diagram showing the outline of the configuration of an electric vehicle 20 as an example of the disclosure. As shown in the drawing, the electric vehicle 20 of the example includes a motor 32, an inverter 34, a battery 36, a boost converter 40, and an electronic control unit 50.

The motor 32 is constituted as a synchronous motor generator, and includes a rotor with a permanent magnet embedded therein and a stator with three-phase coils wound therearound. The rotor of the motor 32 is connected to a drive shaft 26 which is coupled to drive wheels 22a, 22b through a differential gear 24.

The inverter 34 is connected to a motor 32 and is connected to a boost converter 40 through a high voltage system power line 42. The inverter 34 has six transistors T11 to T16 and six diodes D11 to D16. The transistors T11 to T16 are provided in pairs respectively so as to constitute a source side and a sink side relative to a positive electrode bus line and a negative electrode bus line of the high voltage system power line 42. The six diodes D11 to D16 are respectively connected in reversely parallel with the transistors T11 to T16. The three-phase coils (U-phase, V-phase, and W-phase) of the motor 32 are respectively connected to respective connection points between the paired transistors of the transistors T11 to T16. Accordingly, when a voltage is applied to the inverter 34, the ratio of the on time of the respective paired transistors T11 to T16 is adjusted by the electronic control unit 50, whereby a rotating magnetic field is formed in the three-phase coils and the motor 32 is rotationally driven. Hereinafter, the transistors T11 to T13 are referred to as an "upper arm", and the transistors T14 to T16 are referred to as a "lower arm". A smoothing capacitor 46 is attached to the positive electrode bus line and the negative electrode bus line of the high voltage system power line 42.

The battery 36 is constituted as, for example, a lithium-ion secondary battery or a nickel-hydrogen secondary battery, and is connected to the boost converter 40 through a low voltage system power line 44. A smoothing capacitor 48 is attached to a positive electrode bus line and a negative electrode bus line of the low voltage system power line 44.

The boost converter 40 is connected to the high voltage system power line 42 and the low voltage system power line 44. The boost converter 40 has two transistors T31, T32, two diodes D31, D32, and a reactor L. The transistor T31 is connected to the positive electrode bus line of the high voltage system power line 42. The transistor T32 is connected to the transistor T31 and the negative electrode bus lines of the high voltage system power line 42 and of the low voltage system power line 44. The two diodes D31, D32 are respectively connected in reversely parallel with the transistors T31, T32. The reactor L is connected to a connection point between the transistors T31, T32 and the positive electrode bus line of the low voltage system power line 44. The ratio of the on time of the transistors T31, T32 is adjusted by the electronic control unit 50, whereby the boost converter 40 supplies electric power of the low voltage system power line 44 to the high voltage system power line 42 with boosting a voltage or supplies electric power of the high voltage system power line 42 to the low voltage system power line 44 with deboosting a voltage.

The electronic control unit 50 is constituted as a microprocessor centering on a CPU 52, and includes, in addition to the CPU 52, a ROM 54 which stores a processing program, a RAM 56 which temporarily stores data, and an input/output port.

Signals from various sensors are input to the electronic control unit 50 through the input port. As the signals input to the electronic control unit 50, for example, a rotation position θm from a rotation position detection sensor (for example, a resolver) 32a which detects a rotation position of the rotor of the motor 32, and phase currents Iu, IV from current sensors 32u, 32v which detect currents flowing in the respective phases of the motor 32 can be exemplified. A voltage VB from a voltage sensor 36a attached between the terminals of the battery 36, and a current IB from a current sensor 36b attached to an output terminal of the battery 36 can also be exemplified. A voltage VH of a capacitor 46 (high voltage system power line 42) from a voltage sensor 46a attached between the terminals of the capacitor 46, and a voltage VL of a capacitor 48 (low voltage system power line 44) from a voltage sensor 48a attached to the terminals of the capacitor 48 can also be exemplified. An ignition signal from an ignition switch 60, a shift position SP from a shift position sensor 62 which detects an operation position of a shift lever 61, an accelerator pedal angle Acc from an accelerator pedal position sensor 64 which detects a depression amount of an accelerator pedal 63, and a brake pedal position BP from a brake pedal position sensor 66 which detects a depression amount of a brake pedal 65 can also be exemplified. A vehicle speed VS from a vehicle speed sensor 68 can also be exemplified.

Various control signals are output from the electronic control unit 50 through the output port. As the signals output from the electronic control unit 50, for example, a switching control signal to the transistors T11 to T16 of the inverter 34 and a switching control signal to the transistors T31, T32 of the boost converter 40 can be exemplified.

The electronic control unit 50 calculates an electric angle θe or a rotation speed Nm of the motor 32 based on the rotation position θm of the rotor of the motor 32 from the rotation position detection sensor 32a. The electronic control unit 50 calculates a state of charge SOC of the battery 36 based on an integrated value of the current IB of the battery 36 from the current sensor 36b. The state of charge SOC is the ratio of the capacity of electric power dischargeable from the battery 36 to the total capacity of the battery 36.

In the electric vehicle 20 of the example configured as above, the electronic control unit 50 performs the following traveling control. In the traveling control, required torque Td* required for the drive shaft 26 is set based on the accelerator pedal angle Acc and the vehicle speed VS, the set required torque Td* is set as a torque command Tm* of the motor 32, and switching control of the transistors T11 to T16 of the inverter 34 is performed such that the motor 32 is driven with the torque command Tm*. A target voltage VH* of the high voltage system power line 42 is set such that the motor 32 can be driven with the torque command Tm*, and switching control of the transistors T31, T32 of the boost converter 40 is performed such that the voltage VH of the high voltage system power line 42 becomes the target voltage VH*.

Here, control of the inverter 34 will be described. In the example, as the control of the inverter 34, any one of sine-wave PWM (pulse width modulation) control, overmodulation PWM control, and rectangular-wave control is executed. The sine-wave PWM control is control for controlling the inverter 34 such that a pseudo three-phase AC voltage is applied (supplied) to the motor 32, overmodulation control is control for controlling the inverter 34 such that an overmodulation voltage is applied to the motor 32, and a rectangular-wave control is control for controlling the inverter 34 such that a rectangular-wave voltage is applied to the motor 32. In a case of executing the sine-wave PWM control, when a pulse width modulation voltage based on the sine-wave voltage is set as the pseudo three-phase AC voltage, a modulation factor Rm becomes a value of 0 to about 0.61, and when a pulse width modulation voltage based on a voltage after superimposition obtained by superimposing a 3n-order (for example, third-order) harmonic voltage on the sine-wave voltage is set as the pseudo three-phase AC voltage, the modulation factor Rm becomes a value of 0 to about 0.71. The modulation factor Rm is the ratio of an effective value of an output voltage (an applied voltage to the motor 32) to an input voltage (the voltage VH of the high voltage system power line 42) of the inverter 34. In the example, in order to increase the area of the modulation factor Rm where the sine-wave PWM control is executable, the pulse width modulation voltage based on the voltage after superimposition is set as the pseudo three-phase AC voltage. In a case of executing the rectangular-wave control, the modulation factor Rm becomes about 0.78. In the example, in consideration of these, any one of the sine-wave PWM control, the overmodulation PWM control, and the rectangular-wave control is executed based on the modulation factor Rm. Hereinafter, the sine-wave PWM control will be described. It should be noted that the overmodulation control or the rectangular-wave control is not characteristic of the disclosure, and thus, detailed description thereof will be omitted.

As the sine-wave PWM control, in the example, a PWM signal of the transistors T11 to T16 is generated based on the modulation factor Rm and a voltage phase θp of the voltage and the number Np of pulses at a predetermined cycle (for example, a half-cycle, one cycle, or the like of an electric angle θe of the motor 32) to perform switching of the transistors T11 to T16. In this case, the PWM signal is generated so as to reduce (for example, minimize) iron loss of the motor 32 or the PWM signal is generated so as to reduce (for example, minimize) harmonics (in particular, lower-order harmonics, such as sixth-order of rotation or 12th-order of rotation of the motor 32) of a voltage or a current, whereby it is possible to reduce iron loss of the motor 32 or to reduce harmonics.

Figure 2:
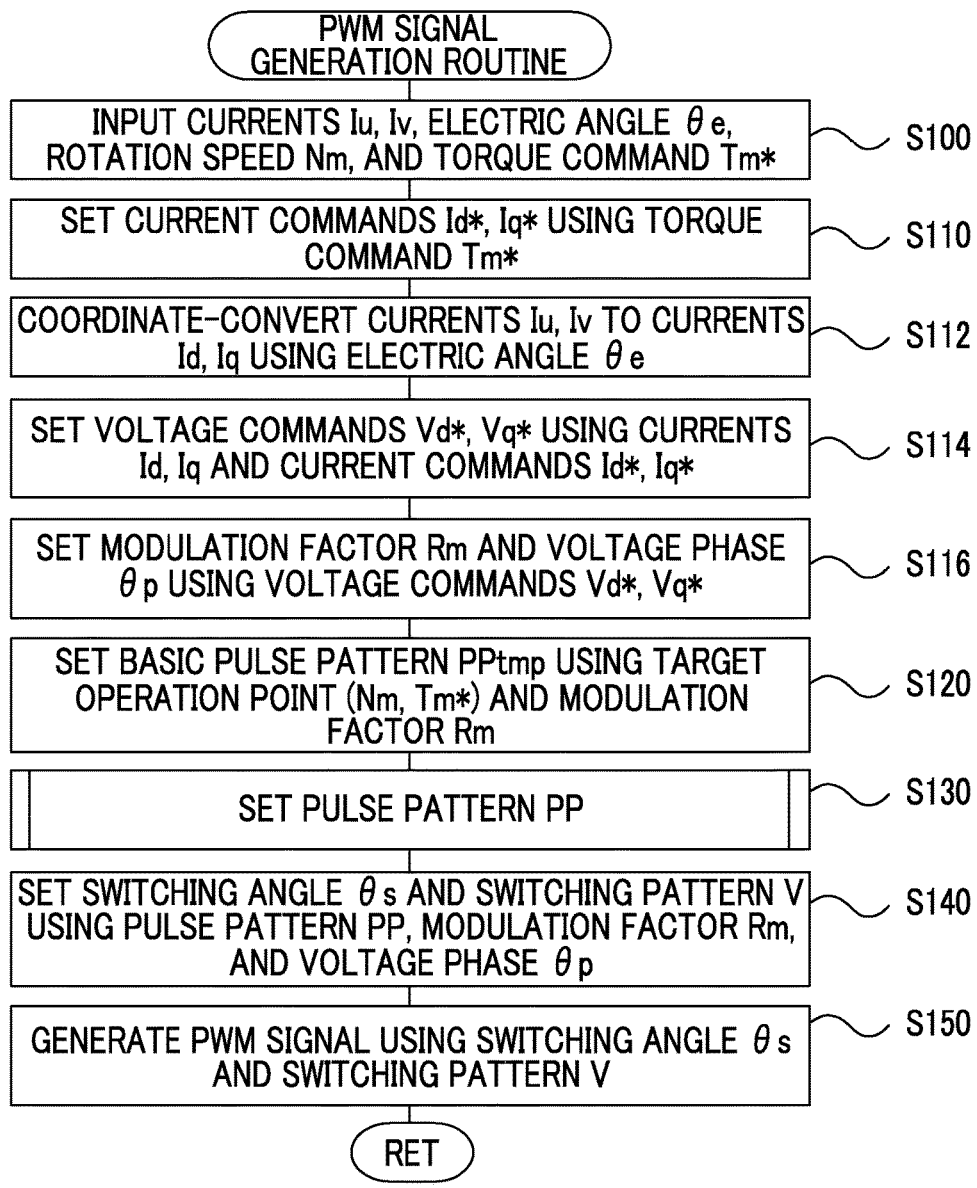
FIG. 2 is a flowchart showing an example of a PWM signal generation routine which is executed by an electronic control unit of the example.

Next, the operation of the electric vehicle 20 of the example configured as above, in particular, the operation when generating the PWM signal for use in the sine-wave PWM control will be described. FIG. 2 is a flowchart showing an example of a PWM signal generation routine which is executed by the electronic control unit 50 of the example. This routine is repeatedly executed.

If the PWM signal generation routine is executed, the CPU 52 of the electronic control unit 50 first receives data, such as the phase currents Iu, Iv, the electric angle θe, the rotation speed Nm, and the torque command Tm* of the motor 32, as input (Step S100). For the phase currents Iu, Iv of the motor 32, values detected by the current sensors 32u, 32v are input. For the electric angle θe or the rotation speed Nm of the motor 32, a value calculated based on the rotation position θm of the rotor of the motor 32 detected by the rotation position detection sensor 32a is input. For the torque command Tm* of the motor 32, a value set by the above-described drive control is input.

If data is input in this way, current commands Id*, Iq* of a d-axis and a q-axis are set based on the torque command Tm* of the motor 32 (Step S110). Subsequently, the total sum of the currents flowing in the respective phases (U-phase, V-phase, and W-phase) of the motor 32 is defined to be a value of 0, and the phase currents Iu, Iv of the U-phase and the V-phase are coordinate-converted to currents Id, Iq of the d-axis and the q-axis using the electric angle θe of the motor 32 (three-phase to two-phase conversion) (Step S112). Then, voltage commands Vd*, Vq* of the d-axis and the q-axis are set by the sum of feedback terms based on differences ΔId, ΔIq between the current commands Id*, Iq* of the d-axis and the q-axis and the currents Id, Iq of the d-axis and the q-axis and feedforward terms for cancelling terms of the d-axis and the q-axis interfering with each other (Step S114).

If the voltage commands Vd*, Vq* of the d-axis and the q-axis are set in this way, the modulation factor Rm and the voltage phase θp of the voltage are set using the set voltage commands Vd*, Vq* of the d-axis and the q-axis (Step S116). The modulation factor Rm can be obtained by dividing a voltage command absolute value Vdq calculated as a square root of the square of the voltage command Vd* of the d-axis and the square of the voltage command Vq* of the q-axis by the voltage VH of the high voltage system power line 42. The voltage phase θp can be obtained as an angle of a vector with the voltage commands Vd*, Vq* of the d-axis and the q-axis as components to the q-axis.

Next, a basic pulse pattern PPtmp as a basic pattern of a pulse pattern PP is set based on a target operation point having the rotation speed Nm and the torque command Tm* of the motor 32 and the modulation factor Rm (Step S120), and the pulse pattern PP is set based on the set basic pulse pattern PPtmp by a pulse pattern setting routine described below (Step S130).

The pulse pattern PP is a combination of a pulse type PT and the number Np of pulses in the PWM control. In the example, as the pulse type PT, a type PWMa of generating a PWM signal so as to reduce (for example, minimize) iron loss of the motor 32 and a type PWMb of generating a PWM signal so as to reduce (for example, minimize) harmonics (in particular, lower-order harmonics) of a voltage or a current are used. In regard to the basic pulse pattern PPtmp, in the example, the relationship between the target operation point and the modulation factor Rm of the motor 32 and the basic pulse pattern PPtmp is stored in the ROM 54 as a map in advance, and if the target operation point and the modulation factor Rm of the motor 32 are given, these are applied to the map to set the basic pulse pattern PPtmp. In the example, the pulse type PT and the number Np of pulses of the basic pulse pattern PPtmp are set based on an experiment result or an analysis result of the inventors as follows. In regard to the pulse type PT, in order to allow the motor 32 to be driven more satisfactorily (in order to appropriately achieve reduction in iron loss or harmonics), the type PWMa is used in an area where the absolute value of the torque command Tm* or the modulation factor Rm of the motor 32 is comparatively small, and the type PWMb is used in an area where the absolute value of the torque command Tm* or the modulation factor Rm is comparatively large. In regard to the number Np of pulses, in order to achieve reduction in the total loss of the motor 32 and the inverter 34, the number of Np of pulses decreases when the modulation factor Rm is large compared to when the modulation factor Rm is small. As the number Np of pulses, for example, a value of about 5 to 15 is used.

Subsequently, a switching angle θs and a switching pattern V are set based on the pulse pattern PP, the modulation factor Rm, and the voltage phase θp (Step S140), a PWM signal is generated based on the set switching angle θs and switching pattern V (Step S150), and this routine ends.

The switching angle θs is an angle for switching the phase voltage (the on/off of the transistors of the corresponding phase among the transistors T11 to T16, for example, in the U-phase, the on/off of the transistors T11, T14) of each phase of the motor 32.

The switching pattern V is a pattern indicating combinations of the on/off of the transistors T11 to T13, and patterns V0 to V7 are used. The reason because the combinations of the on/off of the transistors T11 to T13 is used instead of the combinations of the on/off of the transistors T11 to T16 is that there is no difference even if the combinations of the on/off of the transistors T14 to T16 are omitted without turning on the corresponding upper arm and lower arm among the transistors T11 to T16 simultaneously. The patterns V0 to V7 are as follows.

Figure 3:
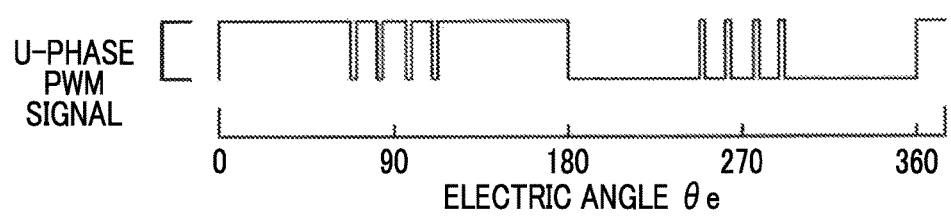
FIG. 3 is an explanatory view showing an example of a PWM signal of a U-phase of a motor.

Pattern V0: all of the transistors T11 to T13 are off
Pattern V1: the transistors T11, T12 are off and the transistor T13 is on
Pattern V2: the transistors T11, T13 are off and the transistor T12 is on
Pattern V3: the transistor T11 is off and the transistors T12, T13 are on
Pattern V4: the transistor T11 is on and the transistors T12, T13 are off
Pattern V5: the transistors T11, T13 are on and the transistor T12 is off
Pattern V6: the transistors T11, T12 are on and the transistor T13 is off
Pattern V7: all transistors T11 to T13 are on An example of the PWM signal of the U-phase (transistor T11) of the motor 32 is shown in FIG. 3. If the PWM signal is generated in this way, switching of the transistors T11 to T16 of the inverter 34 is performed using the generated PWM signal. That is, switching of the transistors T11 to T16 is performed at the switching angle θs of the motor 32 so as to become the switching pattern V corresponding to the switching angle θs. With such control, it is possible to reduce iron loss of the motor 32 or to reduce harmonics of a voltage or a current according to the pulse pattern PP having the pulse type PT (PWMa or PWMb) and the number Np of pulses.

Next, processing (the processing of Step S130 of the PWM signal generation routine of FIG. 2) for setting the pulse pattern PP will be described. In the example, the pulse pattern PP is set by a pulse pattern setting routine of FIG. 4. In the pulse pattern setting routine, the CPU 52 of the electronic control unit 50 first calculates a rotation speed change rate ΔNm as the amount of change in the rotation speed Nm of the motor 32 per unit time and a torque command change rate ΔTm* as the amount of change in the torque command Tm* per unit time (Step S200), compares the absolute value of the calculated rotation speed change rate ΔNm of the motor 32 with a threshold ΔNmref (Step S202), and compares with the absolute value of the torque command change rate ΔTm* of the motor 32 with a threshold ΔTmref (Step S204). The thresholds ΔNmref, ΔTmref are thresholds which are used in order to determine whether or not the target operation point (rotation speed Nm and torque command Tm*) of the motor 32 is substantially constant.

In Step S202, when the absolute value of the rotation speed change rate ΔNm of the motor 32 is greater than the threshold ΔNmref or in Step S204, when the absolute value of the torque command change rate ΔTm* of the motor 32 is greater than the threshold ΔTmref, it is determined that the target operation point of the motor 32 is not substantially constant, the basic pulse pattern PPtmp is set as the pulse pattern PP (Step S210), and this routine ends.

In Step S202, when the absolute value of the rotation speed change rate ΔNm of the motor 32 is equal to or less than the threshold ΔNmref, and in Step S204, when the absolute value of the torque command change rate ΔTm* of the motor 32 is equal to or less than the threshold ΔTmref, it is determined that the target operation point of the motor 32 is substantially constant, and it is determined whether or not the determination that the target operation point of the motor 32 is substantially constant has just been started (Step S220). Then, when it is determined that the determination has just been started, one of a plurality of tables Tpc is set as a selected table ST based on the basic pulse pattern PPtmp (Step S230), a number k which is applied to the selected table ST is set to a value of 1 (Step S240), and the number k is applied to the selected table ST to set the pulse pattern PP and a continuation counter Ccn1 (Step S250). In Step S220, when it is determined that the determination that the target operation point of the motor 32 is substantially constant has not just been started, the processing of Steps S230 to S250 is not executed.

Each table Tpc is a table in which the relationship of the number k, the pulse pattern PP, and the continuation counter Ccn1 is defined, and is defined for each basic pulse pattern PPtmp. An example of each table Tpc is shown in FIGS. 5A and 5B. FIG. 5A shows the table Tpc when the basic pulse pattern PPtmp is a pattern A, and FIG. 5B shows the table Tpc when the basic pulse pattern PPtmp is a pattern C. Patterns A, B, C, D of FIGS. 5A and 5B can be appropriately set based on the specification of the motor 32, the inverter 34, or the like. For example, the pattern A can be defines as a pattern in which the pulse type PT is the type PWMa and the number Np of pulses is a value of 7, and the pattern B can be defined as a pattern in which the pulse type PT is the type PWMb and the number Np of pulses is a value of 9. In the example, as the combination of the pulse pattern PP used in each table Tpc, as indicated by the relationship between the pulse pattern PP and the harmonic component rate of each order of FIG. 6, an order corresponding to a component having the largest harmonic component rate in harmonics uses a different combination.

The continuation counter Ccn1 is a counter corresponding to a rotation amount (a rotation amount at the electric angle θe) θecn in which the corresponding pulse pattern PP (the pulse pattern PP having the same number k) in each table Tpc is continued, and a value obtained by dividing the rotation amount θecn by 60° is used. It should be noted that 60° at the electric angle θe means an interval (rotation amount) of zero cross of the phase voltage (pseudo AC voltage) of any one of the U-phase, the V-phase, and the W-phase of the motor 32.

Next, a lapse counter Ccn in the current pulse pattern PP is input (Step S260). The lapse counter Ccn is a counter which is reset to a value of 0 when the pulse pattern PP is changed and is incremented by a value of 1 each time the electric angle θe in the current pulse pattern PP crosses the electric angle (for example, 0°, 60°, 120°, 180°, 240°, and 300°) for every 60° at which the zero cross of the phase voltage (pseudo AC voltage) of any one of the U-phase, the V-phase, and the W-phase occurs.

If the lapse counter Ccn is input in this way, the lapse counter Ccn is compared with the continuation counter Ccn1 (Step S270). Then, when the lapse counter Ccn is equal to or less than the continuation counter Ccn1, the current pulse pattern PP and the continuation counter Ccn1 are retained (Step S280), and this routine ends. When the lapse counter Ccn is greater than the continuation counter Ccn1, the number k is incremented by a value of 1 and updated (Step S290), the number k after update is applied to the selected table ST to set (update) the pulse pattern PP and the continuation counter Ccn1 (Step S300), and this routine ends. As described above, since the lapse counter Ccn is incremented by the value of 1 whenever crossing the electric angle for every 60° at which the zero cross of the phase voltage of any one of the U-phase, the V-phase, and the W-phase occurs, and the continuation counter Ccn1 is a multiple of 60°, the pulse pattern PP, and consequently the switching angle θs are switched at the timing at which the zero cross of the phase voltage of any one of the U-phase, the V-phase, and the W-phase of the motor 32 occurs. With this, it is possible to suppress degradation of the controllability of the motor 32 when switching the pulse pattern PP, and consequently the switching angle θs.

If the pulse pattern PP (pulse type PT and the number Np of pulses) is changed in this way, the switching angle θs is changed. A specific operation is as follows. A switching frequency N in one cycle of the electric angle θe of the motor 32 becomes a product of the number Np of pulses of the pulse pattern PP, a value of 2 (rising and falling of each pulse), and a value of 3 (U-phase, V-phase, and W-phase). When the pulse type PT is changed as change in the pulse pattern PP without changing the number Np of pulses, the switching angles θs[1] to θs[N] are changed without changing the switching frequency N. When the number Np of pulses is changed as change in the pulse pattern PP, the switching angles θs[1] to θs[N] of the motor 32 are changed by changing the switching frequency N, regardless of whether or not the pulse type PT is changed. An example of a state of change in the PWM signal of the U-phase when the pulse type PT is changed as change in the pulse pattern PP without changing the number Np of pulses is shown in FIG. 7. FIG. 7 shows a state where an upper side and a lower side are alternately changed.

In this way, the switching angles θs[1] to θs[N] of the motor 32 are changed, whereby it is possible to change an order corresponding to component having the highest harmonic component rate in harmonics. As a result, it is possible to reduce the degree of prominence of a specific order component in harmonics relative to other order components, and to suppress an increase in electromagnetic noise. Then, in a case where both of the number Np of pulses and the pulse type PT are changed as change in the pulse pattern PP, it is possible to further disperse respective order components in harmonics and to further suppress an increase in electromagnetic noise compared to a case where only one of the number Np of pulses and the pulse type PT is changed. In addition, since an order corresponding to component having the highest harmonic component rate in harmonics uses a different combination as the combination of the pulse pattern PP of each table Tpc (selected table ST), it is possible to change the switching angle θs such that an order corresponding to component having the highest harmonic component rate in harmonics is different, to more effectively disperse respective order components in harmonics, and to more effectively suppress an increase in electromagnetic noise. The cycle (continuation counter Ccn1) for changing the pulse pattern PP is changed, whereby it is possible more effectively disperse respective order components in harmonics and to more effectively suppress an increase in electromagnetic noise compared to a case where the cycle is constant.

In the electric vehicle 20 of the example described above, when the absolute value of the rotation speed change rate ΔNm of the motor 32 is equal to or less than the threshold ΔNmref and the absolute value of the torque command change rate ΔTm* of the motor 32 is equal to or less than the threshold ΔTmref, the switching angle θs is changed by cyclically changing the pulse type PT or the number Np of pulses as change in the pulse pattern PP. With this, respective order components of harmonics are dispersed, whereby it is possible to reduce the degree of prominence of a specific order component in harmonics relative to other order components. As a result, it is possible to suppress an increase in electromagnetic noise. In addition, the cycle (continuation counter Ccn1) for changing the pulse pattern PP, and consequently, the switching angle θs is made variable. With this, respective order components in harmonics are dispersed, whereby it is possible to further reduce the degree of prominence of a specific order component relative to other order components.

In the electric vehicle 20 of the example, when the absolute value of the rotation speed change rate ΔNm of the motor 32 is equal to or less than the threshold ΔNmref and the absolute value of the torque command change rate ΔTm* of the motor 32 is equal to or less than the threshold ΔTmref, the switching angle θs is changed by cyclically changing the pulse type PT or the number Np of pulses as change in the pulse pattern PP. However, the switching angle θs may be changed by changing only one of the pulse type PT and the number Np of pulses.

In the electric vehicle 20 of the example, when the absolute value of the rotation speed change rate ΔNm of the motor 32 is equal to or less than the threshold ΔNmref and the absolute value of the torque command change rate ΔTm* of the motor 32 is equal to or less than the threshold ΔTmref, the cycle (continuation counter Ccn1) for changing the pulse pattern PP, and consequently, the switching angle θs is made variable. However, the cycle may be made constant.

In the electric vehicle 20 of the example, when the absolute value of the rotation speed change rate ΔNm of the motor 32 is equal to or less than the threshold ΔNmref and the absolute value of the torque command change rate ΔTm* of the motor 32 is equal to or less than the threshold ΔTmref, if the lapse counter Ccn exceeds the continuation counter Ccn1, the number k incremented by the value of 1 is applied to the selected table ST to update the pulse pattern PP (pulse type PT and the number Np of pulses) and the continuation counter Ccn1, and the lapse counter Ccn is reset to the value of 0. However, a plurality of tables Tpc (selected table ST) are not used, and if the lapse counter Ccn exceeds the continuation counter Ccn1, the pulse pattern PP and the continuation counter Ccn1 may be updated in a random manner, and the lapse counter Ccn may be reset to the value of 0.

In the electric vehicle 20 of the example, as the pulse type PT of the pulse pattern PP for use when generating a PWM signal, two types including the type PWMa of generating a PWM signal so as to reduce iron loss of the motor 32 and the type PWMb of generating a PWM signal so as to reduce harmonics of a voltage or a current are used. However, as the pulse type PT, three or more pulse types PT may be used. In this case, for example, a type of generating a PWM signal so as to reduce iron loss of the motor 32, a type of generating a PWM signal so as to reduce copper loss of the motor 32, a type of generating a PWM signal so as to reduce a torque ripple of the motor 32, a type of generating a PWM signal so as to reduce loss of the inverter 34, a type of generating a PWM signal so as to reduce the total loss of the motor 32 and the inverter 34, a type of generating a PWM signal so as to reduce harmonics of a voltage, a type of generating a PWM signal so as to reduce harmonics of a current, and the like may be used.

In the electric vehicle 20 of the example, as the pulse type PT of the pulse pattern PP for use when generating a PWM signal, only one type may be used. In this case, as the pulse pattern PP, a pattern according to only the number Np of pulses may be set. Accordingly, when the absolute value of the rotation speed change rate ΔNm of the motor 32 is equal to or less than the threshold ΔNmref and the absolute value of the torque command change rate ΔTm* of the motor 32 is equal to or less than the threshold ΔTmref, the switching angle θs may be changed by changing the number Np of pulses.

In the electric vehicle 20 of the example, although the boost converter 40 is provided between the battery 36 and the inverter 34, the boost converter 40 may not be provided.

Figure 8:
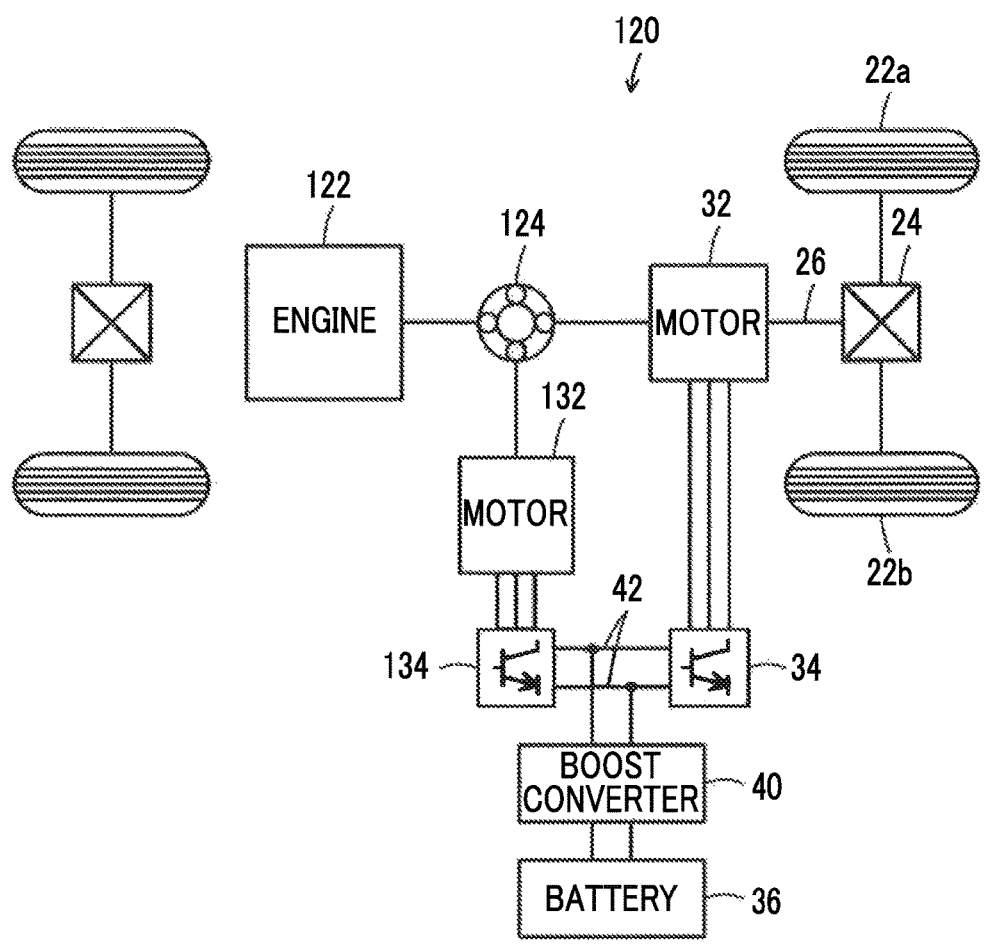
FIG. 8 is a configuration diagram showing the outline of the configuration of a hybrid vehicle of a modification example.

In the electric vehicle 20 of the example, a configuration is made in which the motor 32, the inverter 34, and the battery 36 are provided. However, as shown in a hybrid vehicle 120 of a modification example of FIG. 8, a configuration may be made in which an engine 122, a planetary gear 124, a motor 132, and an inverter 134 are provided in addition to the motor 32 and the inverter 34. Here, the motor 132 is connected to a sun gear of the planetary gear 124, the engine 122 is connected to a carrier of the planetary gear 124, and the drive shaft 26 and the motor 32 are connected to a ring gear of the planetary gear 124. The inverter 134 is connected to the motor 132 and is connected to the high voltage system power line 42.

The correspondence relationship between the primary components of the example and the primary components of the disclosure described in Summary will be described. In the example, although the motor 32 is described as a "motor", the inverter 34 is described as an "inverter", the battery 36 is described as a "battery", and the electronic control unit 50 is described as an "electronic control unit", this is an example of the disclosure.

The correspondence relationship between the primary components of the example and the primary components of the disclosure described in Summary should not be considered to limit the components of the disclosure described in Summary since the example is only illustrative to specifically describe the aspects of the disclosure. That is, the disclosure described in Summary should be interpreted based on the description in Summary, and the example is only a specific example of the disclosure described in Summary.

Although the mode for carrying out the disclosure has been described above in connection with the example, the disclosure is not limited to the example, and can be of course carried out in various forms without departing from the spirit and scope of the disclosure.

The disclosure is usable in a manufacturing industry of a vehicle, or the like.

What is claimed is:
1. A vehicle comprising:
a motor for traveling;
an inverter configured to drive the motor through switching of a plurality of switching elements;
a battery configured to exchange electric power with the motor through the inverter; and
an electronic control unit configured to:
generate a PWM signal of the plurality of switching elements based on a switching angle and a switching pattern at the switching angle, the switching angle being an angle based on a modulation factor of a PWM voltage based on a torque command of the motor, a voltage phase of the PWM voltage based on a torque command of the motor, and a number of pulses at a predetermined cycle of an electric angle of the motor, perform switching of the plurality of switching elements based on the PWM signal, and cyclically change the switching angle when both of a rotation speed change rate and a torque command change rate are within a predetermined range including zero, the rotation speed change rate being an amount of change in a rotation speed of the motor per unit time, the torque command change rate being an amount of change in the torque command per unit time.

2. The vehicle according to claim 1, wherein the electronic control unit is configured to change the switching angle by cyclically changing the number of pulses when both of the rotation speed change rate and the torque command change rate are within the predetermined range.

3. The vehicle according to claim 1, wherein the electronic control unit is configured to generate the PWM signal based on the modulation factor, the voltage phase, the number of pulses, and a selected type selected from a plurality of pulse types including a pulse type that generates the PWM signal to reduce iron loss of the motor and a pulse type that generates the PWM signal to reduce harmonics, and the electronic control unit is configured to change the switching angle by cyclically changing at least one of the number of pulses or the selected type when both of the rotation speed change rate and the torque command change rate are within the predetermined range.

4. The vehicle according to claim 1, wherein the electronic control unit is configured to cyclically change the switching angle such that a component having a highest order harmonic of a lower-order harmonics before the switching angle is changed such that the highest order harmonic of the lower-order harmonics differs from a component having the highest order harmonic of the lower-order harmonics after the switching angle is changed.

5. The vehicle according to claim 1, wherein the electronic control unit is configured to change the predetermined cycle for changing the switching angle.

6. The vehicle according to claim 1, wherein the electronic control unit is configured to control the plurality of switching elements in a first switching pattern and a second switching pattern by cyclically changing the switching angle, and an order of the harmonics most frequently appearing in the first switching pattern is different from an order of the harmonics most frequently appearing in the second switching pattern.

7. A control method for a vehicle, the vehicle including:
a motor for traveling,
an inverter configured to drive the motor through switching of a plurality of switching elements,
a battery configured to exchange electric power with the motor through the inverter, and an
electronic control unit,
the control method comprising:
generating a PWM signal of the plurality of switching elements based on a switching angle and a switching pattern at the switching angle by the electronic control unit, the switching angle being an angle based on a modulation factor of a PWM voltage based on a torque command of the motor, a voltage phase of the PWM voltage based on a torque command of the motor, and a number of pulses at a predetermined cycle of an electric angle of the motor, performing switching of the plurality of switching elements based on the PWM signal by the electronic control unit, and cyclically changing the switching angle when both of a rotation speed change rate and a torque command change rate are within a predetermined range including zero by the electronic control unit, the rotation speed change rate being an amount of change in a rotation speed of the motor per unit time, the torque command change rate being an amount of change in the torque command per unit time.

8. The vehicle according to claim 1, wherein the number of pulses at the predetermined cycle of the electric angle of the motor is based on a rotational speed of the motor and the torque command of the motor, wherein the electronic control unit is configured to perform switching of the plurality of switching elements based on the PWM signal to reduce lower-order harmonics or to reduce iron loss of the motor.

9. The method according to claim 7, wherein the number of pulses at the predetermined cycle of the electric angle of the motor is based on a rotational speed of the motor and the torque command of the motor, wherein performing the switching of the plurality of switching elements is based on the PWM signal to reduce lower-order harmonics or to reduce iron loss of the motor.

10. A vehicle comprising:
a motor for traveling;
an inverter configured to drive the motor through switching of a plurality of switching elements;
a battery configured to exchange electric power with the motor through the inverter; and an
electronic control unit configured to generate a PWM signal of the plurality of switching elements based on:
receiving phase currents of the motor, an electric angle of the motor, a rotation speed of the motor, and a torque command of the motor, converting the phase currents of the motor from a three phase to a two phase using the electric angle of the motor, determining a modulation factor of a PWM voltage based on a torque command of the motor, a voltage phase of the PWM voltage based on a torque command of the motor, setting a number of pulses at a predetermined cycle of an electric angle of the motor based on a rotational speed and the torque command of the motor, setting a switching angle and a switching pattern at the switching angle, the switching angle being an angle based on the modulation factor of the PWM voltage based on the torque command of the motor, the voltage phase of the PWM voltage based on the torque command of the motor, and the number of pulses at predetermined cycle of an electric angle of the motor based on a rotational speed and the torque command of the motor, perform switching of the plurality of switching elements based on the PWM signal to reduce lower-order harmonics or to reduce iron loss of the motor, and cyclically change the switching angle when both of a rotation speed change rate and a torque command change rate are within a predetermined range including zero, the rotation speed change rate being an amount of change in a rotation speed of the motor per unit time, the torque command change rate being an amount of change in the torque command per unit time.

\* \* \* \* \*